United States Patent [19]

Wang et al.

[11] Patent Number: 5,706,369

[45] Date of Patent: Jan. 6, 1998

[54] BASE-N RESOLUTION CONVERTER

[75] Inventors: Angela L. Wang, Huntington Beach; David M. Colwell, Anaheim; Dianne L. Steiger, Irvine, all of Calif.

[73] Assignee: Rockwell International Corporation, Newport Beach, Calif.

[21] Appl. No.: 456,137

[22] Filed: May 31, 1995

[51] Int. Cl.$^6$ .............................. G06K 9/42; H04N 1/40
[52] U.S. Cl. .................. 382/299; 382/299; 358/445; 358/447; 358/451
[58] Field of Search ......................... 358/445, 447, 358/468, 451, 431; 382/299, 298

[56] References Cited

U.S. PATENT DOCUMENTS

| | | | |
|---|---|---|---|
| 3,976,982 | 8/1976 | Eiselen | 382/298 |
| 4,628,534 | 12/1986 | Marshall | 382/299 |
| 4,841,375 | 6/1989 | Nakajima et al. | 358/287 |
| 4,907,171 | 3/1990 | Nagashima | 358/451 |

*Primary Examiner*—Kim Vu
*Assistant Examiner*—Tia M. Harris
*Attorney, Agent, or Firm*—William C. Cray; Philip K. Yu

[57] ABSTRACT

A resolution conversion system for real-time expansion and reduction of a first plurality of input pixels into a second plurality of output pixels. The resolution conversion system comprises a base-n counter for counting input pixels as each pixel is captured. The base-n counter has a plurality of carry out signals. Also, there is a control register for selectively enabling the carry out signals of the base-n counter based on a predetermined resolution ratio between the first plurality of input pixels and the second plurality of output pixels. The control register uses a mode bit to select either one of inserting and removing operations. An inserting logic unit is used for inserting, as indicated by the mode bit, a pixel into the plurality of input pixels upon a transition of one of the carry out signals if the carry out signals have been enabled by the control register. A removing logic unit is used for removing, as indicated by the mode bit, a pixel from the plurality of input pixels upon a transition of one of the carry out signals of the base-n counter if the carry out signals have been enabled by the control register.

23 Claims, 6 Drawing Sheets

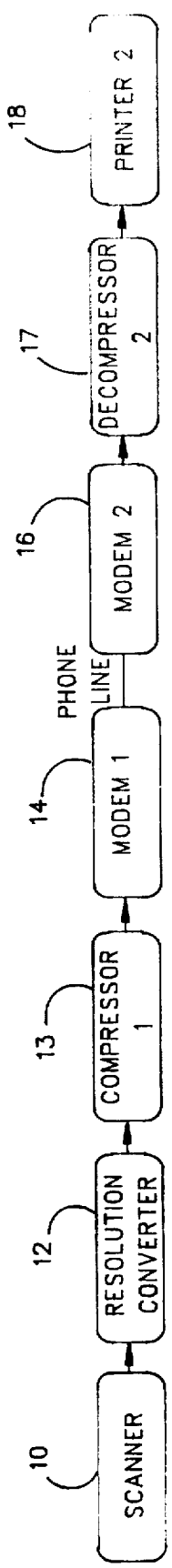
*FIG. 1 FAX TRANSMISSION*
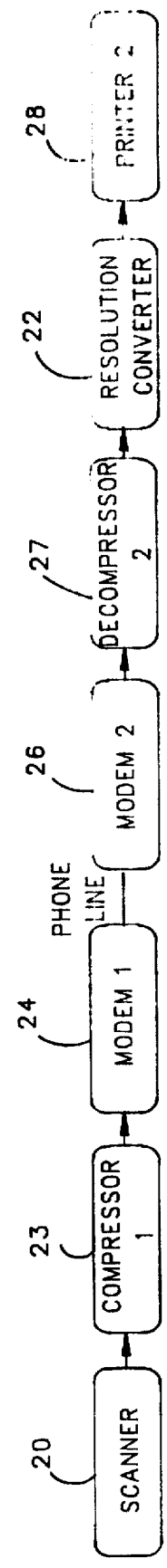
*FIG. 2 FAX RECEPTION*
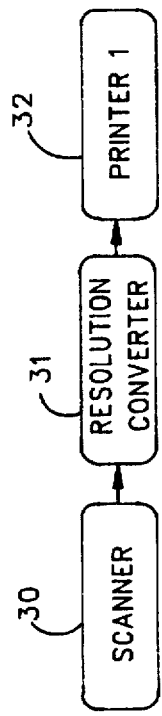
*FIG. 3 FAX OR MULIFUNCTIONAL COPYING*

BASE-N RESOLUTION CONVERTER

FIELD OF THE INVENTION

The present invention relates to facsimile ("FAX") machines and multifunctional machines which include facsimile functions, and more particularly to machines with different resolution capabilities between scanned images and printouts.

ART BACKGROUND

Most conventional fax machines had scanners and thermal printers with compatible resolution capabilities. Typically, the resolution of these fax scanners and printers were either 200 dpi or 400 dpi ("dots per inch"). There was minimal or no resolution conversion required to communicate between fax scanners and printers.

As the technology and market have developed and expanded to include plain paper (laser and inkjet) fax, the resolution of fax scanners and printers are no longer compatible and resolution conversion becomes necessary. Some scenarios where resolution conversion is required for the fax machine is illustrated in FIGS. 1–3. Note that current fax scanners typically scan images at 200 dpi or 400 dpi. Scanners in multifunctional machines scan at resolutions of 200 dpi, 300 dpi, 400 dpi, 600 dpi or greater. Current plain paper printers print images at varying resolutions, the most typical being 300 dpi, 360 dpi, 600 dpi and 720 dpi.

In FIG. 1, a fax transmission is illustrated. A document is first scanned by a scanner 10 and the resolution of the image data is then converted by a resolution converter 12. The converted image data may then be compressed by a compressor 13 before it is transmitted by a modem 14 through a phone line to a receiving modem 16. The image data is then de-compressed by a decompressor 17 before it is outputted by a printer 18. Note that the underlying assumption here is that the scanner 10 and printer 18 have different resolution capabilities and the transmitting machine is able to determine the resolution capabilities of the receiving machine through a T.30 protocol.

It would be appreciated by those skilled in the art that the above scenario may be applicable in the case of a multifunctional machine where the scanner resolution is greater than the printer resolution supported by the receiving machine.

In FIG. 2, a fax reception scenario is illustrated. A document is scanned 20, compressed 23 and transmitted by a modem 24 through a phone line. In this scenario, it is also assumed that the scanner 20 and printer 28 have different resolution capabilities and that the receiving machine is able to determine at what resolution the image data is being transmitted. Upon receiving the image data using a modem 26, the image data is de-compressed 27 and converted 22 before it is printed out.

The scenario illustrated In FIG. 3 applies to many plain paper fax/copy multifunctional machines, where a document is scanned 30 into image data. To be able to print the document out with a plain paper printer 32, the image data is resolution-converted 31.

Although conversion between these standard resolutions seems trivial, given the simple ratios, the problem of conversion is actually more complicated and involved since the actual ratios used for resolution conversion depend on the number of effective dots scanned and printed on the page which vary considerably.

As an example, a typical expansion from a 200 dpi scanner to a 300 dpi printer is given below:

Input Scanner Resolution = 1728 pixels/line

Output Printer Resolution = 2456 pixels/line

Expansion Ratio = Output Resolution/Input Resolution $$= \frac{2456}{1728} = \frac{307}{216} = 1\frac{91}{216}$$

Therefore, 91 additional pixels must be inserted for every 216 input pixels.

Therefore, it would be desirable to have a resolution converter capable of providing a universal solution to the problem of expanding or reducing any size scanned image line so that it may be output to a printer with any resolution capability. Also, it would be desirable to have a low-complexity resolution converter implemented with no multipliers required, such that the converter may be efficiently implemented in hardware circuitry, while providing superior quality in converted images.

SUMMARY OF THE INVENTION

Therefore, it is an object of the present invention to maximize output image quality while minimizing hardware logic for resolution conversion by fax and multifunctional machines.

It is also an object of the present invention to provide a universal solution to expansion and reduction of scanned images into any resolution or size desired.

The base-N resolution converter as disclosed in the present application is able to expand or reduce an image line by adding or deleting a programmable amount of pixels per line. The amount of pixels to add or delete is determined by calculation given the input and desired output resolutions and entered into a set of registers. The location of where to add or delete pixels in the original image line is determined by comparing the status of an input pixel counter with the value written into the register. For a base-3 application, the input pixel counter, initialized to zero at the beginning of each image line, is a binary implementation of a 7-digit base-3 up counter. Since each base-3 digit requires two bits for representation, a total of 14 bits is used to implement the counter.

A resolution conversion system for real-time expansion and reduction of a first plurality of input pixels into a second plurality of output pixels is disclosed. The resolution conversion system comprises a base-n counter for counting input pixels as each pixel is captured. The base-n counter has a plurality of carry out signals. Also, there is a control register for selectively enabling the carry out signals of the base-n counter based on a predetermined resolution ratio between the first plurality of input pixels and the second plurality of output pixels. The control register uses a mode bit to select either one of inserting and removing operations. An inserting logic unit is used for inserting, as indicated by the mode bit, a pixel into the plurality of input pixels upon a transition of one of the carry out signals if the carry out signals have been enabled by the control register. A removing logic unit is used for removing, as indicated by the mode bit, a pixel from the plurality of input pixels upon a transition of one of the carry out signals of the base-n counter if the carry out signals have been enabled by the counter register.

BRIEF DESCRIPTION OF THE DRAWINGS

Additional objects, features and advantages of the present invention will become apparent to those skilled in the art from the following description, wherein:

FIG. 1 illustrates resolution conversion as used in fax transmission.

FIG. 2 illustrates resolution conversion as used in fax reception.

FIG. 3 illustrates resolution conversion as used in copying for plain paper fax, multifunctional, and copy machines.

DETAILED DESCRIPTION OF THE PREFERRED EMBODIMENT

Figure 4:
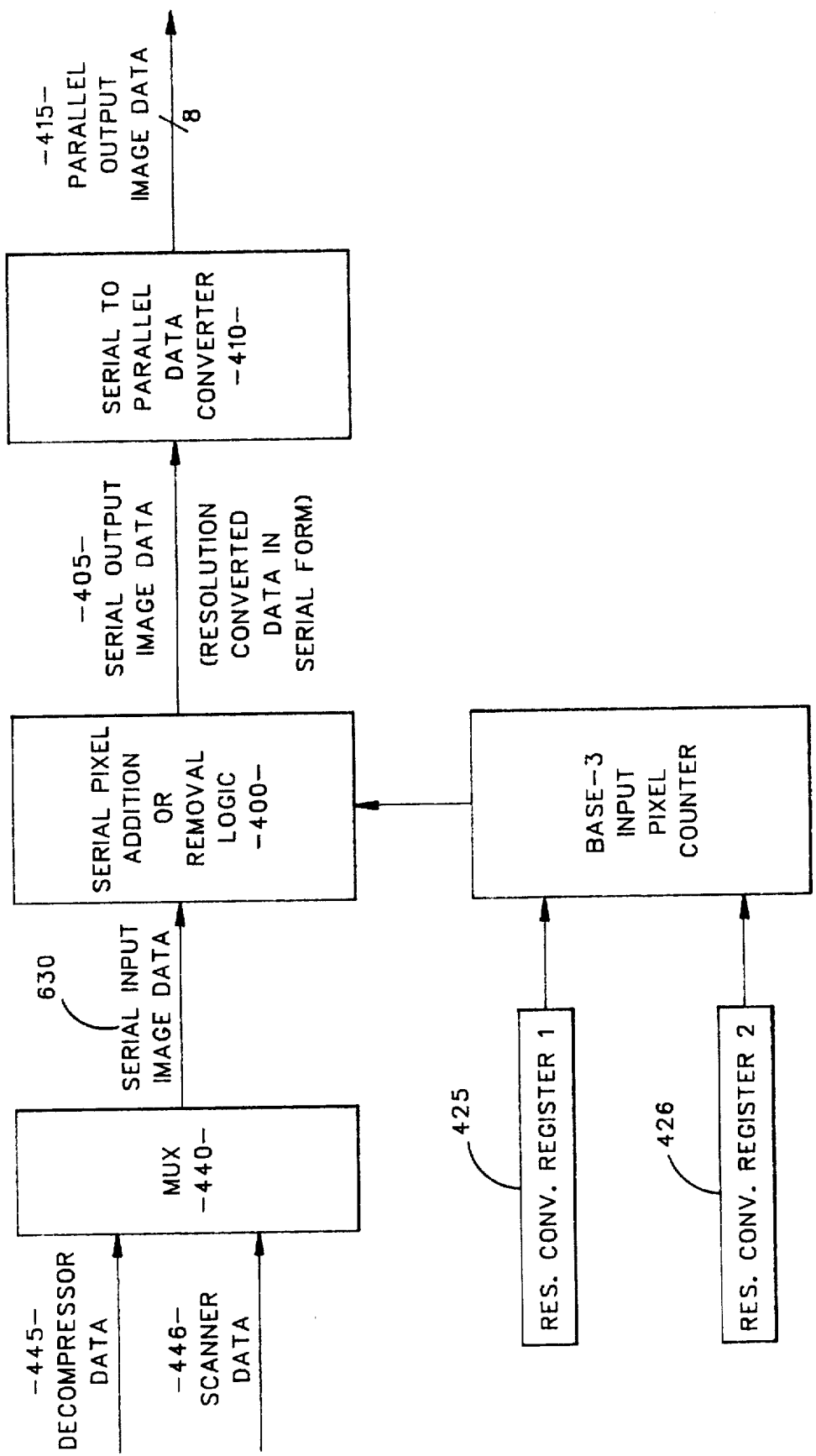
FIG. 4 is a simplified block diagram of a preferred embodiment incorporating the resolution converter core of the present invention.

FIG. 4 is a simplified block diagram of a preferred embodiment incorporating the resolution converter core of the present invention. A data source multiplexer 440 selects either the scanner data 446 or decompressor data 445 as serial input image data 430 to an addition/removal logic 400. The addition/removal logic performs addition or removal of pixels when triggered. A base-3 input pixel counter 420, an up-counter, counts the number of incoming pixels and triggers the addition/removal logic 400 at the proper count.

It should be noted that although the resolution converter of the present invention is described as implemented by a base-3 methodology, those skilled in the art should appreciate that other base numbering systems can be readily adapted for their particular application.

Resolution conversion registers 425, 426 contain the control information to select either expansion or reduction mode and the total number of pixels to add or remove in a line. For a base-3 implementation, the registers 425, 426 supply the total number of pixels to add or delete in multiples of powers of 3.

After conversion, serial image data 405 is output from the addition/removal logic 400 and is converted from serial to parallel 410 such that image data 415 may be generated a byte at a time.

The resolution converter, as functionally represented by the addition/removal logic 400, registers 425, 426 and pixel counter 420 will be described in more detail as follows.

FUNCTIONAL DESCRIPTION

1. METHODOLOGY

Figure 5:
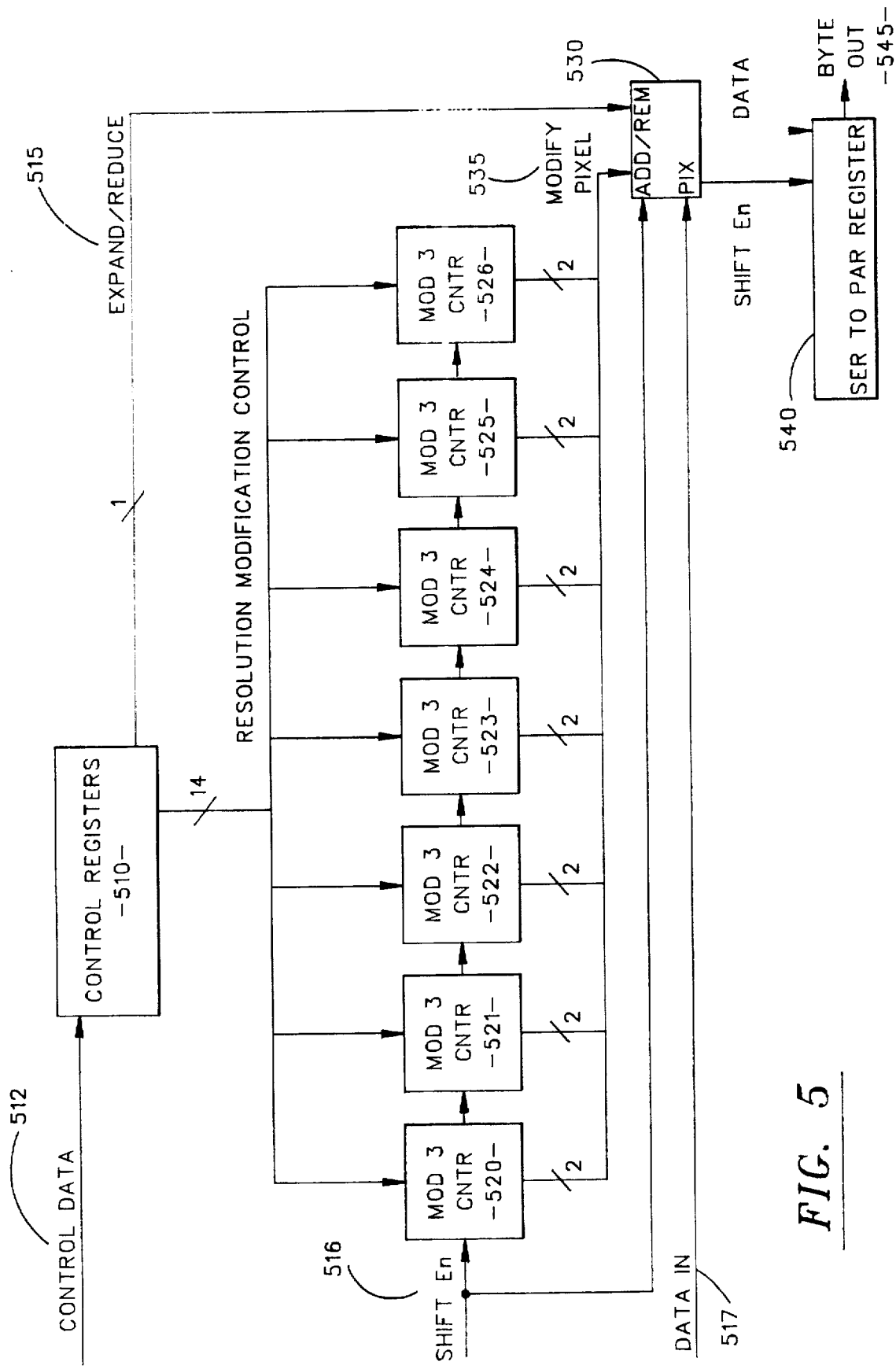
FIG. 5 shows a functional block diagram of the resolution converter in more detail.

Reference is to FIG. 5, where a functional block diagram of the resolution converter is illustrated in more detail. The resolution converter, when enabled, performs expansion or reduction of a horizontal bi-level line. Data In 517, from a scanner, decompressor or whichever source the image data is derived. A mode bit 515 in the resolution conversion control register unit 510 controls whether the line is expanded or reduced. Note that for a base-3 implementation, the control register 510 comprises two 8-bit control registers for the reason to be further described below.

In expansion mode with the current implementation, an input line, Data In 517, can be expanded from 1 up to (1+2186/2187), or approximately 2, times its original resolution. Extra pixels are inserted into the input line at predetermined intervals resulting in a longer output line.

The number of pixels to insert is determined by the expansion ratio:

$$\text{expansion ratio} = \frac{(\text{output resolution} - \text{input resolution})}{\text{input resolution}}$$

It should be noted that for existing logic, output resolution <(2*input resolution).

The expansion ratio represents the fraction of a pixel that should be added for each input pixel. Since it may not be feasible to print a fraction of a pixel for each input pixel, an alternative approach is to insert a whole pixel after a specified number of input pixels. For example, for an expansion ratio of 1/3, one pixel should be added for every three input pixels. If this is done over the entire input line, the output line will be exactly (1+1/3) times longer than the input line as targeted.

Prior to resolution expansion, the expansion ratio is calculated and converted to a 7-digit base-3 fraction. Each digit in the base-3 fraction carries a certain weight as indicated below:

| | Base-3 Fraction | | | | | | |
|---|---|---|---|---|---|---|---|
| | MSD | | | | | | LSD |
| Digit n: | 0 | 1 | 2 | 3 | 4 | 5 | 6 |
| Weight: | 1/3 | 1/9 | 1/27 | 1/81 | 1/243 | 1/729 | 1/2187 |

Note:
MSD is abbreviation for Most Significant Digit
LSD is abbreviation Least Significant Digit Each base-3 digit can take on three possible values: 0, 1, or 2. If digit n is set to 1, then it means one pixel should be inserted for every $3^{(n+1)}$ input pixels. If digit n is set to 2, then it means two pixels should be inserted for every $3^{(n+1)}$ input pixels.

Equivalently, if digit n is set to 1 then it means $3^{(6-n)}$ pixels should be inserted for every $3^7$ input pixels. If digit n is set to 2 then it means $2 \times 3^{(6-n)}$ pixels should be inserted for every $3^7$ input pixels.

To accomplish expansion as outlined above and avoid inserting multiple pixels at one time, a 7-digit base-3 input pixel counter is used as shown in Table 1 below:

TABLE 1

| | Base-3 Input Pixel Counter | | | | | | |
|---|---|---|---|---|---|---|---|
| | MSD | | | | | | LSD |
| Digit n: | 6 | 5 | 4 | 3 | 2 | 1 | 0 |
| | 0 | 0 | 0 | 0 | 0 | 0 | 0 |
| | 0 | 0 | 0 | 0 | 0 | 0 | 1 |
| | 0 | 0 | 0 | 0 | 0 | 0 | 2 |
| | 0 | 0 | 0 | 0 | 0 | 1 | 0 |
| | 0 | 0 | 0 | 0 | 0 | 1 | 1 |
| | 0 | 0 | 0 | 0 | 0 | 1 | 2 |
| | 0 | 0 | 0 | 0 | 0 | 2 | 0 |
| : | : | : | : | : | : | : | : |
| : | : | : | : | : | : | : | : |

Initially, the input pixel counter 520–526 is set to zero at the beginning of each line. During resolution expansion, each input pixel is processed one at a time. If digit n of the base-3 fraction, as represented in the control registers 510, is pre-set to 1 or 2 and digit n in the input pixel counter 520–526 has made a transition from 0 to 1, then the current input pixel will be duplicated.

If digit n of the base-3 fraction, as represented in the control registers 510, is pre-set to 2 and digit n in the input pixel counter has made a transition from 1 to 2, then the current pixel will be duplicated. After each input pixel is processed, the input pixel counter increments by one, and the entire process is repeated for the next input pixel.

Note, since the MSD of the base-3 fraction indicates the most frequently inserted pixel (⅓ weight), it will always correspond to the LSD of the input pixel counter 520–526, the most frequently changing counter digit. It is also important to note that as a property of base-3 counters: a 0 to 1 or 1 to 2 transition on any digit of the counter will never coincide with another 0 to 1 or 1 to 2 transition on any other digit of the counter. Therefore, a given input pixel will never be duplicated more than once.

A slightly different but similar method is used for resolution reduction. In reduction mode with the current implementation, an input line can be reduced from 1 down to 1/2187 times its original resolution. However, to preserve image quality, it is preferred that an input line is reduced no more than ⅔ times its original resolution. Reduction beyond this point will result in consecutive pixels in the input line being removed.

In reduction mode, pixels are removed from the original line at predetermined intervals resulting in a shorter output line. To improve image quality and preserve horizontal and diagonal lines, the original pixel following the removed pixel is replaced in the output line with a pixel that is the result of the original pixel "OR'ed" with the removed pixel.

Figure 6:
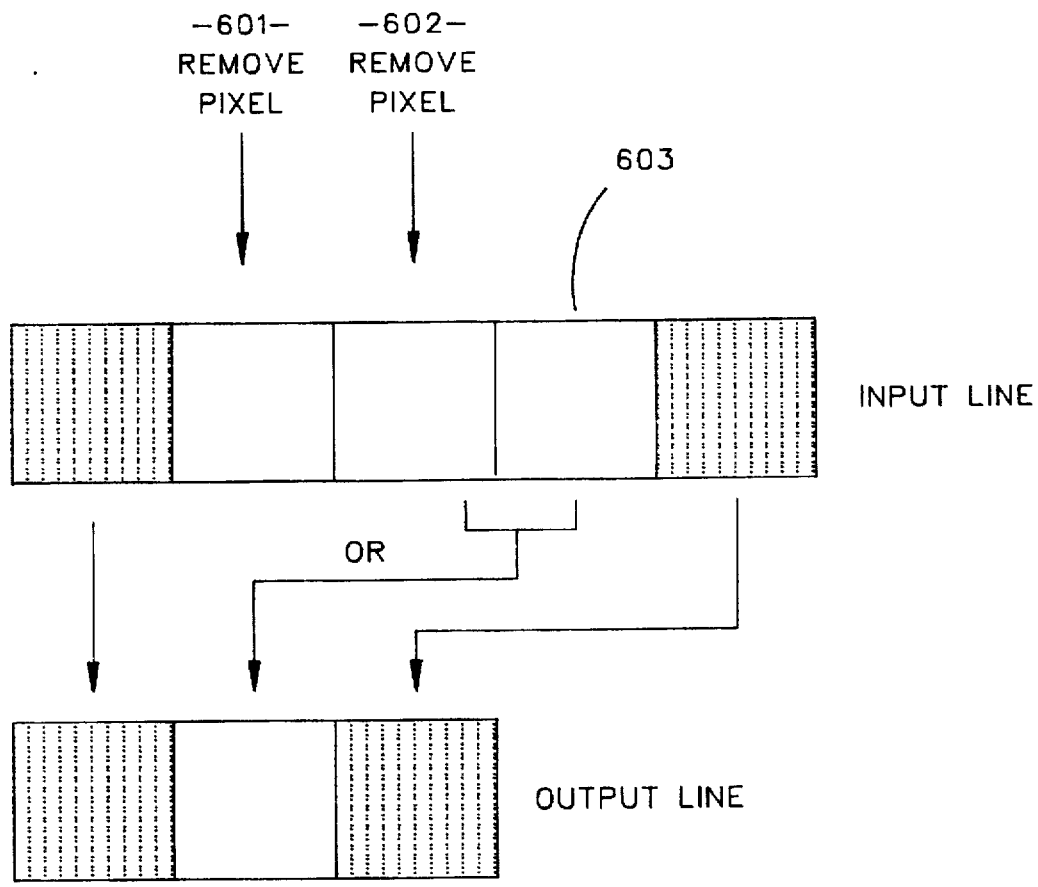
FIG. 6 illustrates a pixel removal event in the case of consecutive pixels being removed from a line.

With reference to FIG. 6, in the event that consecutive pixels 601, 602 in the original line are to be removed, only the last removed pixel 602 is "OR'ed" with the next original pixel 603. The preceding removed pixels 601 are simply dropped to maintain a constant reduction ratio.

The number of pixels to remove is determined by the reduction ratio:

$$\text{reduction ratio} = \frac{(\text{input resolution} - \text{output resolution})}{\text{input resolution}}$$

Note: For reduction, output resolution<input resolution

The reduction ratio represents the fraction of a pixel that should be removed for each input pixel. Since it is not feasible to remove a fraction of a pixel from each input pixel, an alternative approach is to remove a whole pixel after a specified number of input pixels. For example, for a reduction ratio of ⅓, one pixel should be removed for every three input pixels. If this is done over the entire input line, the output line will be exactly ⅔ (=1−⅓) times shorter than the input line as targeted.

Prior to resolution reduction, the reduction ratio is calculated and converted to a 7 digit base-3 fraction. Each digit in the base-3 fraction carries a certain weight as indicated below:

| | Base-3 Fraction | | | | | | |
|---|---|---|---|---|---|---|---|
| | MSD | | | | | | LSD |
| Digit n: | 0 | 1 | 2 | 3 | 4 | 5 | 6 |
| Weight: | 1/3 | 1/9 | 1/27 | 1/81 | 1/243 | 1/729 | 1/2187 |

Each base-3 digit can take on three possible values: 0, 1, or 2. If digit n is set to 1, then it means one pixel should be removed for every $3^{(n+1)}$ input pixels. If digit n is set to 2, then it means two pixels should be removed for every $3^{(n+1)}$ input pixels.

Equivalently, if digit n is set to 1 then it means $3^{(6-n)}$ pixels should be removed for every $3^7$ input pixels. If digit n is set to 2 then it means $2 \times 3^{(6-n)}$ pixels should be removed for every $3^7$ input pixels.

To accomplish reduction as outlined above, a 7 digit base-3 input pixel counter is used as shown in Table 2 below:

TABLE 2

| | Base-3 Input Pixel Counter | | | | | | |
|---|---|---|---|---|---|---|---|
| | MSD | | | | | | LSD |
| Digit n: | 6 | 5 | 4 | 3 | 2 | 1 | 0 |
| | 0 | 0 | 0 | 0 | 0 | 0 | 0 |
| | 0 | 0 | 0 | 0 | 0 | 0 | 1 |
| | 0 | 0 | 0 | 0 | 0 | 0 | 2 |
| | 0 | 0 | 0 | 0 | 0 | 1 | 0 |
| | 0 | 0 | 0 | 0 | 0 | 1 | 1 |
| | 0 | 0 | 0 | 0 | 0 | 1 | 2 |
| | 0 | 0 | 0 | 0 | 0 | 2 | 0 |
| : | : | : | : | : | : | : | : |
| : | : | : | : | : | : | : | : |

Initially, the input pixel counter 520–526 is set to zero at the beginning of each line. During resolution reduction, each input pixel is processed one at a time. If digit n of the base-3 fraction, as represented in the control register 510, is pre-set to 1 or 2 and digit n in the input pixel counter has made a transition from 0 to 1, then the current input pixel will be deleted.

If digit n of the base-3 fraction, as represented in the control register 510, is pre-set to 2 and digit n in the input pixel counter has made a transition from 1 to 2, then the current pixel will be deleted. After each input pixel is processed, the input pixel counter increments by one. If a pixel was deleted, then the next input pixel not flagged for deletion will be replaced by itself "OR'ed" with the last deleted pixel. This extra processing is done in order to preserve horizontal and diagonal lines.

It should be noted that since the MSD of the base-3 fraction indicates the most frequently removed pixel (⅓ weight), it will always correspond to the LSD of the input pixel counter 520–526, the most frequently changing counter digit. It is also important to note that as a property of base-3 counters: a 0 to 1 or 1 to 2 transition on any digit of the counter will never coincide with another 0 to 1 or 1 to 2 transition an any other digit of the counter. Therefore, a given input pixel will never be flagged for deletion more than once.

In summary, the location in the original line at which pixels are flagged to be either inserted or removed depends on two conditions: 1) the result of comparing an input pixel counter 520–526 with the expansion or reduction ratio value represented as a base-3 fraction as represented by the control register 510 and, 2) the previous value of the input pixel counter 520–526.

2. IMPLEMENTATION

Reference to Table 3 below, the input pixel counter 520–526 is a binary implementation of a 7-digit base-3 up counter. Since each base-3 digit requires 2 bits for representation, a total of 14 bits are used to implement the counter. Note that the highest count each base-3 digit can reach is 2.

TABLE 3

| Digit 6 | | Digit 5 | | ... | Digit 2 | | Digit 1 | | Digit 0 | |
|---|---|---|---|---|---|---|---|---|---|---|
| LSB | MSB | LSB | MSB | ... | LSB | MSB | LSB | MSB | LSB | MSB |
| 0 | 0 | 0 | 0 | ... | 0 | 0 | 0 | 0 | 0 | 0 |
| 0 | 0 | 0 | 0 | ... | 0 | 0 | 0 | 0 | 1 | 0 |
| 0 | 0 | 0 | 0 | ... | 0 | 0 | 0 | 0 | 0 | 1 |
| 0 | 0 | 0 | 0 | ... | 0 | 0 | 1 | 0 | 0 | 0 |
| 0 | 0 | 0 | 0 | ... | 0 | 0 | 1 | 0 | 1 | 0 |
| 0 | 0 | 0 | 0 | ... | 0 | 0 | 1 | 0 | 0 | 1 |
| 0 | 0 | 0 | 0 | ... | 0 | 0 | 0 | 1 | 0 | 0 |
| : | : | : | : | : | : | : | : | : | : | : |

The registers associated with resolution conversion are loaded according to the register description given in the next section. Essentially, when any register bit, with the exception of control bits, is set to 1, a pixel will be added or deleted when the corresponding bit in the input pixel counter 520–526 transitions from 0 to 1.

B. CONTROL REGISTER DESCRIPTION

Two control registers 510 are used to implement the resolution conversion logic. Both registers are cleared on reset, and are valid only when they are enabled.

Figure 7:
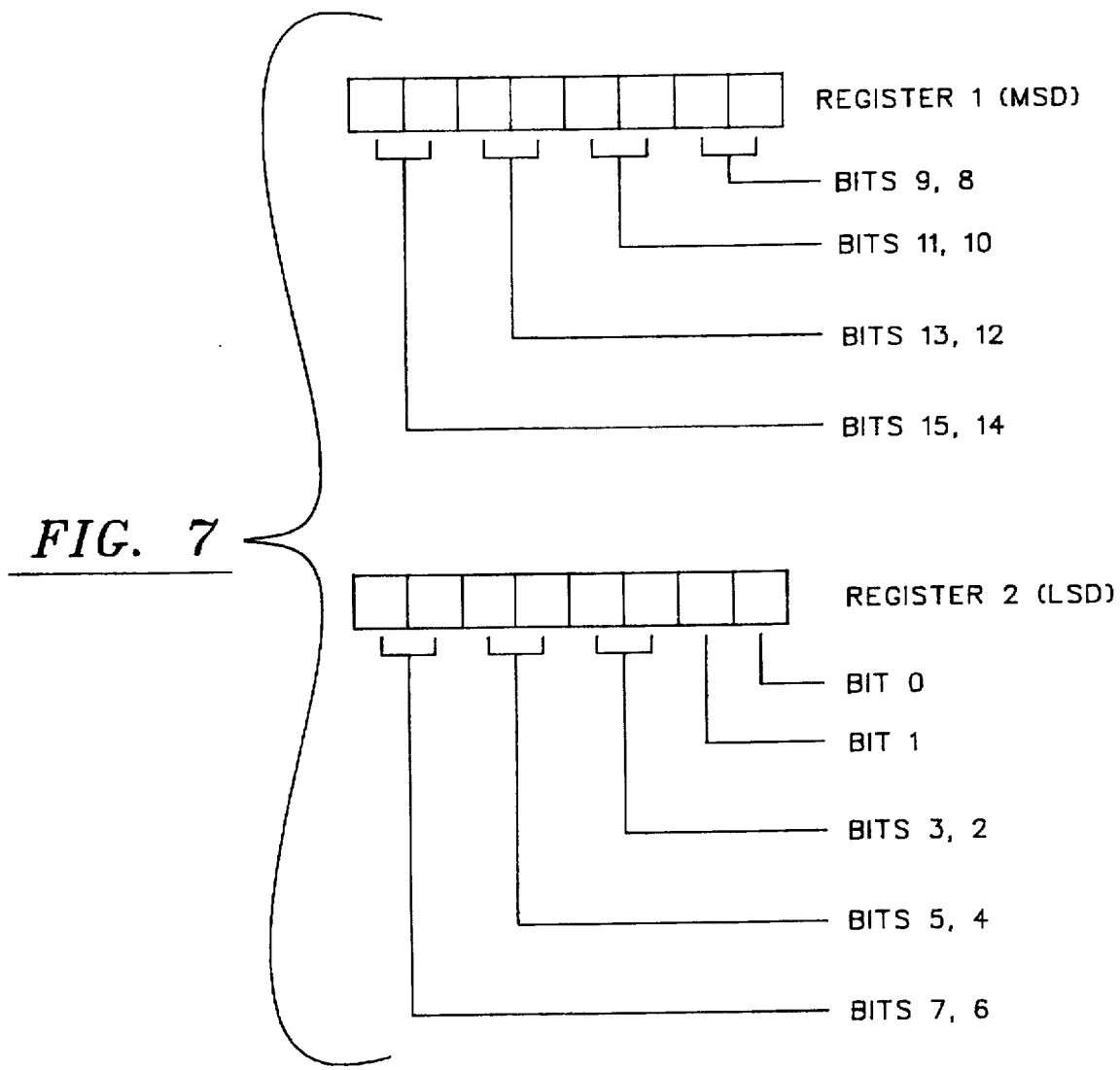
FIG. 7 illustrates how the two control registers may be defined based on the desired resolution.

FIG. 7 illustrates how the 2 control registers may be defined based on the desired resolution. The definition for each bit, as currently implemented, is as follows:

| Pixels to Add/Delete per 2187 input pixels on Register 1 (MSD) | |
|---|---|
| Bits 9, 8 | Add/Delete 27 or 54 pixels per 2187 input pixels (00=0 pixels, 01=not allowed, 10=27 pixels, 11=54 pixels) |
| Bits 11, 10 | Add/Delete 81 or 162 pixels per 2187 input pixels (00=0 pixels, 01=not allowed, 10=81 pixels, 11=162 pixels) |
| Bits 13, 12 | Add/Delete 243 or 486 pixels per 2187 input pixels (00=0 pixels, 01=not allowed, 10=243 pixels, 11=486 pixels) |
| Bits 15, 14 | Add/Delete 729 or 1458 pixels per 2187 input pixels (00=0 pixels, 01=not allowed, 10=729 pixels, 11=1458 pixels) |
| Pixels to Add/Delete per 2187 input pixels on Register 2 (LSD) | |
| Bit 0 | Reverse Output Bit Order (1=Reverse) |
| Bit 1 | Expansion or Reduction Mode (1=Reduction) |
| Bits 3, 2 | Add/Delete 1 or 2 pixels per 2187 input pixels (00=0 pixels, 01=not allowed, 10=1 pixel, 11=2 pixels) |
| Bits 5, 4 | Add/Delete 3 or 6 pixels per 2187 input pixels (00=0 pixels, 01=not allowed, 10=3 pixels, 11=6 pixels) |
| Bits 7, 6 | Add/Delete 9 or 18 pixels per 2187 input pixels (00=0 pixels, 01=not allowed, 10=9 pixels, 11=18 pixels) |

1. REGISTER EXAMPLES

Figure 8:
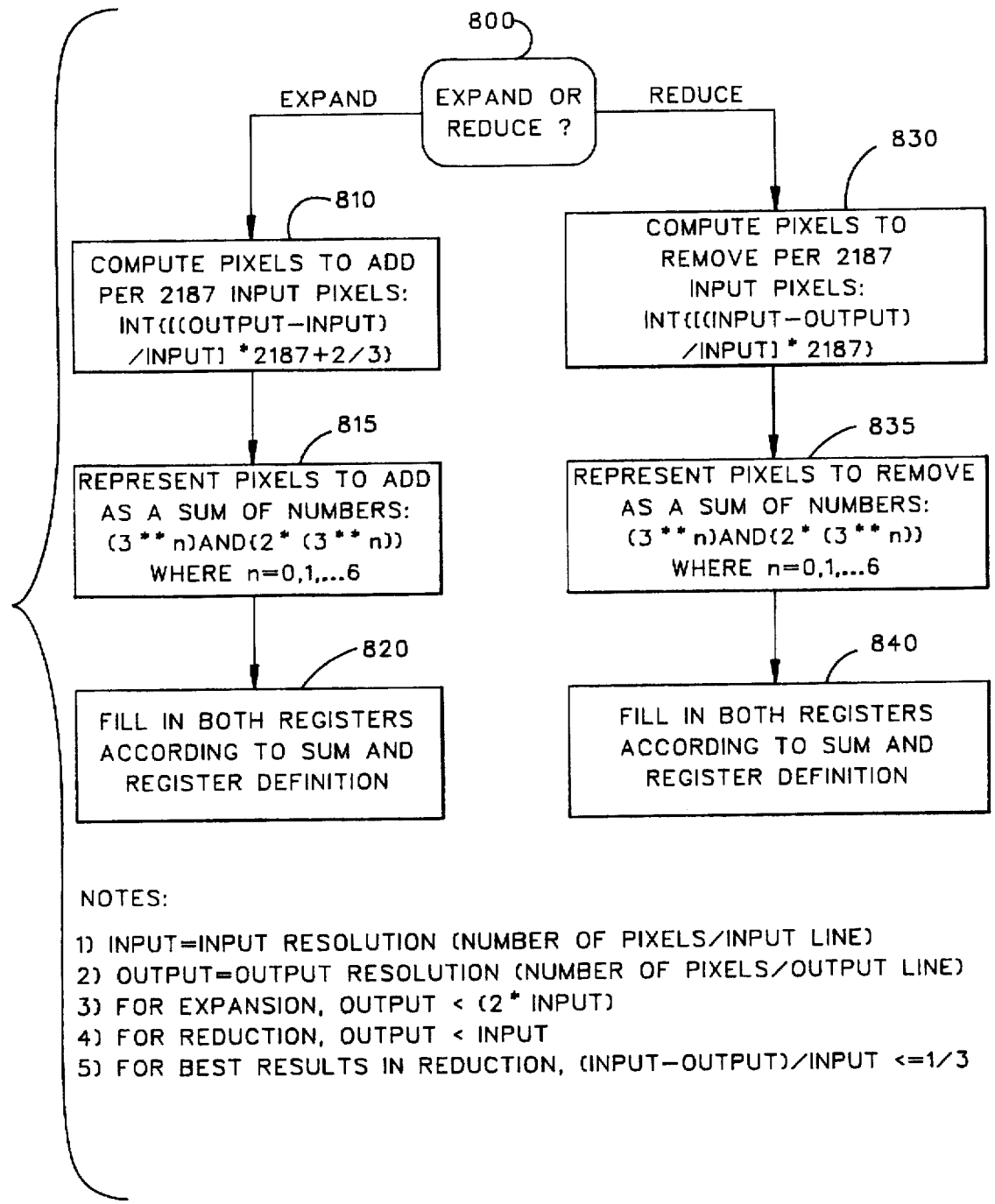
FIG. 8 illustrates a flow chart for determining the values of the resolution conversion registers.

FIG. 8 is a flowchart illustrating the procedure for determining the values of the resolution conversion register 1,2 for both expansion and reduction modes.

Example: Expansion of 1728 pixel/line to 2456 pixel/line

Given:

Input Resolution=1728 pixel/line
Output Resolution=2456 pixel/line
Assumption:
1) Output Resolution must be a multiple of 8 for byte size.
2) Output Resolution<2×(Input Resolution)

In this case, $$\frac{\text{output resolution}}{\text{input resolution}} = \frac{2456}{1728} = \frac{307}{216} = 1\frac{91}{216}.$$

Therefore, ideally 91 pixels will be inserted for every 216 input pixels.

Referring to STEP 810, compute the number of pixels to add per 2187 input pixels:

$$Int\left\{ \frac{(\text{Output} - \text{Input})}{\text{Input}} \times 2187 + \frac{2}{3} \right\} = Int\left\{ \frac{(2456 - 1728)}{1728} \times 3^7 + \frac{2}{3} \right\}$$

$$= Int\left\{ \frac{728}{1728} \times 3^7 + \frac{2}{3} \right\}$$

$$= Int\left\{ 921.375 + \frac{2}{3} \right\}$$

$$= Int\{922.04167\}$$

$$= 922$$

Therefore, 922 pixels are to be added per 2187 input pixels. (STEP 810).

It should be noted that this computation ensures that the number of pixels inserted will always result in the actual output resolution being greater than or equal to the targeted output resolution. At the same time, the actual number of pixels printed will always be a multiple of 8 for byte-sized output.

Referring to STEP 815, the number of pixels to add per 2187 input pixels is represented using powers of 3 as follows:

Using Table 4 below, it is determined which combination of powers of 3 digits are required to represent 922. The sum of the enabled digits should equal 922 as illustrated below:

$$922 = 729 + 162 + 27 + 3 + 1$$

Therefore, digits 729, 162, 27, 3, and 1 should be enabled in the Table 4.

The procedure for finding which digits should be enabled is now summarized. First, compare 1458 with 922. Since 1458 is larger than 922, 1458 is not needed to represent 922. Second, compare 729 with 922. Since 729 is less than 922, 729 is enabled to represent 922.

Now, with the remaining digits, (922−729=193) needs to be represented. Using a similar procedure as before, it is determined that 162 is needed to represent 193. With the remaining digits, (193−162=31) needs to be represented. To represent 31,27 is enabled.

With the remaining digits, (31−27=4) needs to be represented. To represent 4, 3 is enabled. Finally, with the remaining digits, (4–3=1) needs to be represented. To represent 1, "1" is enabled.

TABLE 4

| Pixels to Add per 2187 Input Pixels | "YES" or "NO" Enabled |
|---|---|
| 1458 | "NO" |
| 729 | "YES" |
| 486 | "NO" |
| 243 | "NO" |
| 162 | "YES" |
| 81 | "NO" |
| 54 | "NO" |
| 27 | "YES" |
| 18 | "NO" |
| 9 | "NO" |
| 6 | "NO" |
| 3 | "YES" |
| 2 | "NO" |
| 1 | "YES" |

In STEP 820, the resolution conversion registers are loaded as follows. Based on the digits that have been enabled and the register definition, the following values are loaded into the registers. Note, the mode bit is cleared for expansion and output bit order is not reversed.

Pixels to Add/Delete per 2187 input pixels (MSD) Register=$(10001110)_2$=$8E (hex).

Pixels to Add/Delete per 2187 input pixels (LSD) Register=$(00101000)_2$=$28 (hex).

Example: Reduction of 2048 pixel/line to 1728 pixel/line ( as in B4 to A4 Reduction)

Given:
Input Resolution=2048 pixel/line
Output Resolution=1728 pixel/line
Assumptions:
1) Output Resolution must be a multiple of 8;
2) Output Resolution<Input Resolution;
3)

$$\frac{(\text{input resolution} - \text{output resolution})}{\text{input resolution}} \leq 1/3$$

for best results (i.e. consecutive pixels will not be removed).
In this case, $$\frac{(\text{input resolution} - \text{output resolution})}{\text{input resolution}} = \frac{320}{2048} = \frac{5}{32}.$$

Therefore, ideally 5 pixels will be removed for every 32 input pixels.

Referring to STEP 830, compute the number of pixels to remove per 2187 input pixels:

$$Int\left\{\frac{(\text{Output} - \text{Input})}{\text{Input}} \times 2187\right\} = Int\left\{\frac{(2048 - 1728)}{2048} \times 3^7\right\}$$

$$= Int\left\{\frac{320}{2048} \times 2187\right\}$$

$$= Int\{341.71875\}$$

$$= 341$$

Therefore, 341 pixels will be removed for every 2187 input pixels.

As noted in the previous example, this computation ensures that the number of pixels removed will always result in the actual output resolution being greater than or equal to the targeted output resolution. The actual number of pixels printed will always be a multiple of 8.

Referring to STEP 835, the number of pixels to add per 2187 input pixels is represented using powers of 3.

Using Table 5 below, it is determined which combination of powers of 3 digits are required to represent 341. The sum of the enabled digits should equal 341 as illustrated below:

$$341 = 243+81+9+6+2$$

Therefore, digits 243, 81, 9, 6, and 2 should be enabled as shown in Table 5 below.

TABLE 5

| Pixels to Remove per 2187 Input Pixels | "YES" or "NO" |
|---|---|
| 1458 | "NO" |
| 729 | "NO" |
| 486 | "NO" |
| 243 | "YES" |
| 162 | "NO" |
| 81 | "YES" |
| 54 | "NO" |
| 27 | "NO" |
| 18 | "NO" |
| 9 | "YES" |
| 6 | "NO" |
| 2 | "YES" |
| 1 | "NO" |

In STEP 840, the resolution conversion registers are loaded as follows. Based on the digits that have been enabled and the register definition, the following values are loaded into the registers. Note, the mode bit is set for reduction and output bit order is not reversed.

Pixels to Add/Delete per 2187 input pixels (MSD) Register=$(00101000)_2$=$28 (hex)

Pixels to Add/Delete per 2187 input pixels (LSD) Register=$(10111110)_2$=$BE (hex)

TABLE 6

2. TABLE OF COMMON RESOLUTION CONVERSIONS AND REGISTER SETTINGS
Table 6 below lists the more common resolution conversions along with the appropriate register settings for addition and deletion cases:

| Conversion dots/inch | Input dots/line | Output dots/line | Ideal Pixels to INSERT | Pixels to Insert per 2187 Input | Register1 (Hex Value) | Register2 (Hex Value) |
|---|---|---|---|---|---|---|
| 200 to 300 | 1728 | 2456 | 728 | 922 | $8E | $28 |
| 200 to 360 | 1728 | 2952 | 1224 | 1549 | $C8 | $88 |
| 200 to 400 | 1728 | 3280 | 1552 | 1964 | $F0 | BCC |
| 200 to 300 | 2048 | 2456 | 408 | 436 | $2E | $28 |

TABLE 6-continued

2. TABLE OF COMMON RESOLUTION CONVERSIONS AND REGISTER SETTINGS
Table 6 below lists the more common resolution conversions along with the
appropriate register settings for addition and deletion cases:

| | | | | | | |
|---|---|---|---|---|---|---|
| 200 to 360 | 2048 | 2952 | 924 | 966 | $8F | $E0 |
| 200 to 400 | 2048 | 3280 | 1232 | 1316 | $B8 | BCC |
| Conversion dots/inch | Input dots/line | Output dots/line | Ideal Pixels to REMOVE | Pixels to Remove per 2187 Input | Register1 (Hex Value) | Register2 (Hex Value) |
| 200 to 200 | 2048 | 1728 | 320 | 341 | $28 | $BE |

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden pads together, whereas a screw employs a helical surface, in the environment of fastening wooden pads, a nail and a screw may be equivalent structures.

We claim:

1. A resolution conversion system for real-time modification of a first plurality of input pixels serially captured by a predetermined signal into a second plurality of output pixels, comprising:

a base-n counter for counting said first plurality of input pixels as each pixel is serially captured by said predetermined signal, the base-n counter having a plurality of carry out signals to indicate, when selectively enabled, whether a pixel in said first plurality of input pixels is to be modified;

control register for selectively enabling said carry out signals of said base-n counter based on a base-n difference as represented by a ratio between said second plurality of output pixels and said first plurality of input pixels, said control register also comprising a mode bit to select either one of inserting and removing operations;

pixel modifying means, responsive to said mode bit, for serially modifying said pixel by either inserting or removing, upon a transition of one of said carry out signals selectively enabled by said control register.

2. The resolution conversion system according to claim 1, wherein said pixel modifying means comprises:

inserting means for inserting, as indicated by said mode bit, a pixel into said plurality of input pixels upon a transition of one of said carry out signals of said base-n counter, said one of said carry out signals having been enabled by said control register;

removing means for removing, as indicated by said mode bit, a pixel from said plurality of input pixels upon a transition of one of the carry out signals of the base-n counter, said one of said carry out signals having been enabled by said control register.

3. The resolution conversion system according to claim 2, wherein the inserting means inserts by generating at least one additional said predetermined signal on a current pixel such that said current pixel is replicated at least once.

4. The resolution conversion system according to claim 2, wherein the removing means removes a current pixel from said plurality of input pixels by "OR-ing" said current pixel with at least one pixel subsequent to said current pixel.

5. The resolution conversion system according to claim 2, wherein the removing means removes two consecutive pixels ("a first pixel" and "a second pixel") from said plurality of input pixels by first deleting said first pixel and "OR-ing" said second pixel with at least one pixel subsequent to said second pixel.

6. The system according to claim 2, wherein said base-n counter is a base-3 counter.

7. The system according to claim 3, wherein said base-n counter is a base-3 counter.

8. A method for resolution conversion for real-time serial expansion and reduction of a first plurality of input pixels into a second plurality of output pixels, each of said plurality of input pixels being validated with a predetermined signal ("Shift Enable"), the method comprising the steps of:

a) generating a ratio representing a difference between said first plurality of input pixels and said second plurality of output pixels, said ratio representing the number of pixels to either add to or delete from said first plurality of input pixels to generate said second plurality of output pixels;

b) converting said ratio to a base-n representation in a predetermined number of digits;

c) serially capturing each of said first plurality of input pixels as indicated by said Shift Enable signal;

d) serially tracking each of said first plurality of input pixels using a base-n counter of said predetermined digit to count said Shift Enable signal;

e) selectively enabling said predetermined digits of said n-base counter based on said base-n representation of said ratio;

f) while serially capturing each of said first plurality of input pixels, modifying each pixel by either one of adding and deleting of each of said first plurality of input pixels upon a transition at one of said predetermined number of digits of said base-n counter, said one digit having been selectively enabled by said n-base representation of said ratio.

9. A method according to claim 8, wherein the step of tracking said input pixels is in real-time basis.

10. A method according to claim 8, wherein said base-n is base-3.

11. A method according to claim 9, wherein said base-n is base-3.

12. A method according to claim 9, wherein said base-n representation of said ratio selectively enables said predetermined number of digits of said base-n counter such that the enabled digits causes a pixel to be modified.

13. A method according to claim 10, wherein said base-3 representation of said ratio selectively enables said predetermined number of digits of said base-3 counter such that the enabled digits causes a pixel to be modified.

14. A method according to claim 8, wherein the step of modifying inserts a pixel by duplicating said Shift Enable signal at least once such that said current pixel is replicated at least once.

15. A method according to claim 9, wherein the step of modifying inserts a pixel by duplicating said Shift Enable signal at least once such that said current pixel is replicated at least once.

16. A method according to claim 10, wherein the step of modifying inserts a pixel by duplicating said Shift Enable signal at least once such that said current pixel is replicated at least once.

17. A method according to claim 8, wherein the step f) of modifying, when deleting, each pixel modifies a current pixel from said plurality of input pixels by logically "OR-ing" said current pixel with at least one pixel captured subsequent to said current pixel.

18. A method according to claim 9, wherein the step f) of modifying, when deleting, each pixel modifies a current pixel from said plurality of input pixels by logically "OR-ing" said current pixel with at least one pixel captured subsequent to said current pixel.

19. A method according to claim 10, wherein the step f) of modifying, when deleting, each pixel modifies a current pixel from said plurality of input pixels by logically "OR-ing" said current pixel with at least one pixel captured subsequent to said current pixel.

20. A resolution conversion system for real-time serial expansion and reduction of a first plurality of input pixels serially captured by a predetermined signal into a second plurality of output pixels, comprising:

a base-n counter for counting said predetermined signal as a current pixel from said plurality of input pixel is serially captured and generating a predetermined number of carry-out signals as it counts in base-n;

a control register coupled to said base-n counter for selectively enabling said predetermined number of carry-out signals from said base-n counter based on a base-n representation of a base-n difference as represented by a ratio between said first plurality of input pixels and said second plurality of output pixels;

pixel modify means coupled to said base-n counter and said control register for serially modifying said current pixel, said pixel modify means capturing said current pixel and its corresponding predetermined signal, said pixel modify means modifying said current pixel upon a transition at one of said carry-out signals said carry-out signal having been selectively enabled by said control register.

21. A resolution conversion system according to claim 20, further comprising a serial-to-parallel register coupled to said pixel modify means for receiving pixels and their corresponding predetermined signals from said pixel modify means.

22. A resolution conversion system according to claim 21, wherein said pixel modify means comprises:

add pixel means for inserting a pixel after said current pixel by duplicating a corresponding said predetermined signal of said current pixel at least once and outputting the duplicated predetermined signal to said serial-to-parallel register.

23. A resolution conversion system according to claim 21, wherein said pixel modify means comprises:

delete pixel means for deleting a current pixel by "OR-ing" said current pixel with at least one pixel subsequent to said current pixel and outputting it to said serial-to-parallel register.

* * * * *